(12) United States Patent
Guclucan

(10) Patent No.: US 8,641,101 B2
(45) Date of Patent: Feb. 4, 2014

(54) OIL TRANSFER TUBE AND ASSEMBLY

(75) Inventor: Senol Guclucan, South Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 189 days.

(21) Appl. No.: 13/097,966

(22) Filed: Apr. 29, 2011

(65) Prior Publication Data
US 2012/0273079 A1 Nov. 1, 2012

(51) Int. Cl.
*F16L 17/00* (2006.01)

(52) U.S. Cl.
USPC .......................................... 285/355; 285/220

(58) Field of Classification Search
USPC ............ 285/355, 201, 219, 95, 220, 356, 357
See application file for complete search history.

(56) References Cited

U.S. PATENT DOCUMENTS

| | | | |
|---|---|---|---|
| 2,793,059 A * | 5/1957 | Woodling | 285/220 |
| 3,224,799 A | 12/1965 | Blose et al. | |
| 3,800,174 A | 3/1974 | Butterfield et al. | |
| 4,398,756 A | 8/1983 | Duret et al. | |
| 4,527,911 A | 7/1985 | Davis | |
| 4,572,551 A * | 2/1986 | Jaquette | 285/355 |
| 4,732,416 A | 3/1988 | Dearden et al. | |
| 6,010,163 A | 1/2000 | Cerruti | |
| 6,102,577 A | 8/2000 | Tremaine | |
| 6,322,110 B1 | 11/2001 | Banker et al. | |
| 7,300,075 B2 | 11/2007 | Ebskamp et al. | |
| 7,568,843 B2 | 8/2009 | Lefebvre et al. | |

FOREIGN PATENT DOCUMENTS

WO    WO2008104083 A1    9/2008

* cited by examiner

*Primary Examiner* — Aaron Dunwoody
(74) *Attorney, Agent, or Firm* — Kinney & Lange, P.A.

(57) ABSTRACT

A fluid transfer tube comprises a base, a plurality of external threads, and an annular shoulder. The base is disposed at a first axial end of the tube. The plurality of external threads are integrally formed into at least a portion of the base for securing the base into a boss. The annular shoulder is fixed to an outer diameter of the tube at a first distance from the first axial end, causing the shoulder to contact an outer surface of the boss with the base of the tube at a maximum depth in the receiving portion of the boss to prevent further downward travel of the base.

3 Claims, 6 Drawing Sheets

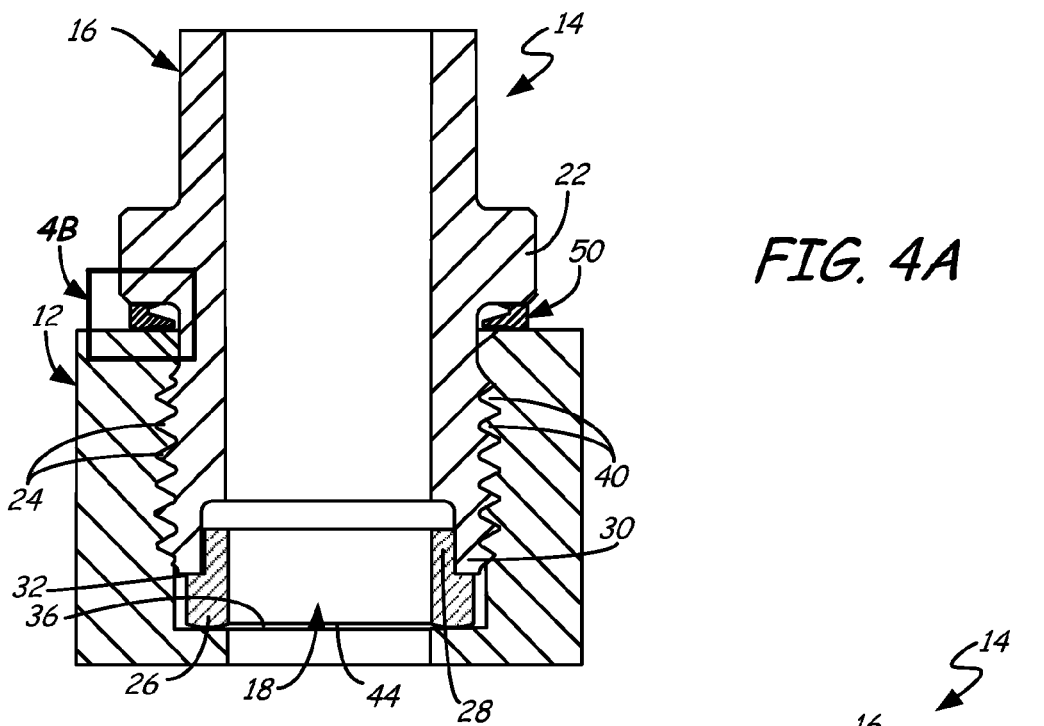
FIG. 4A
FIG. 4B
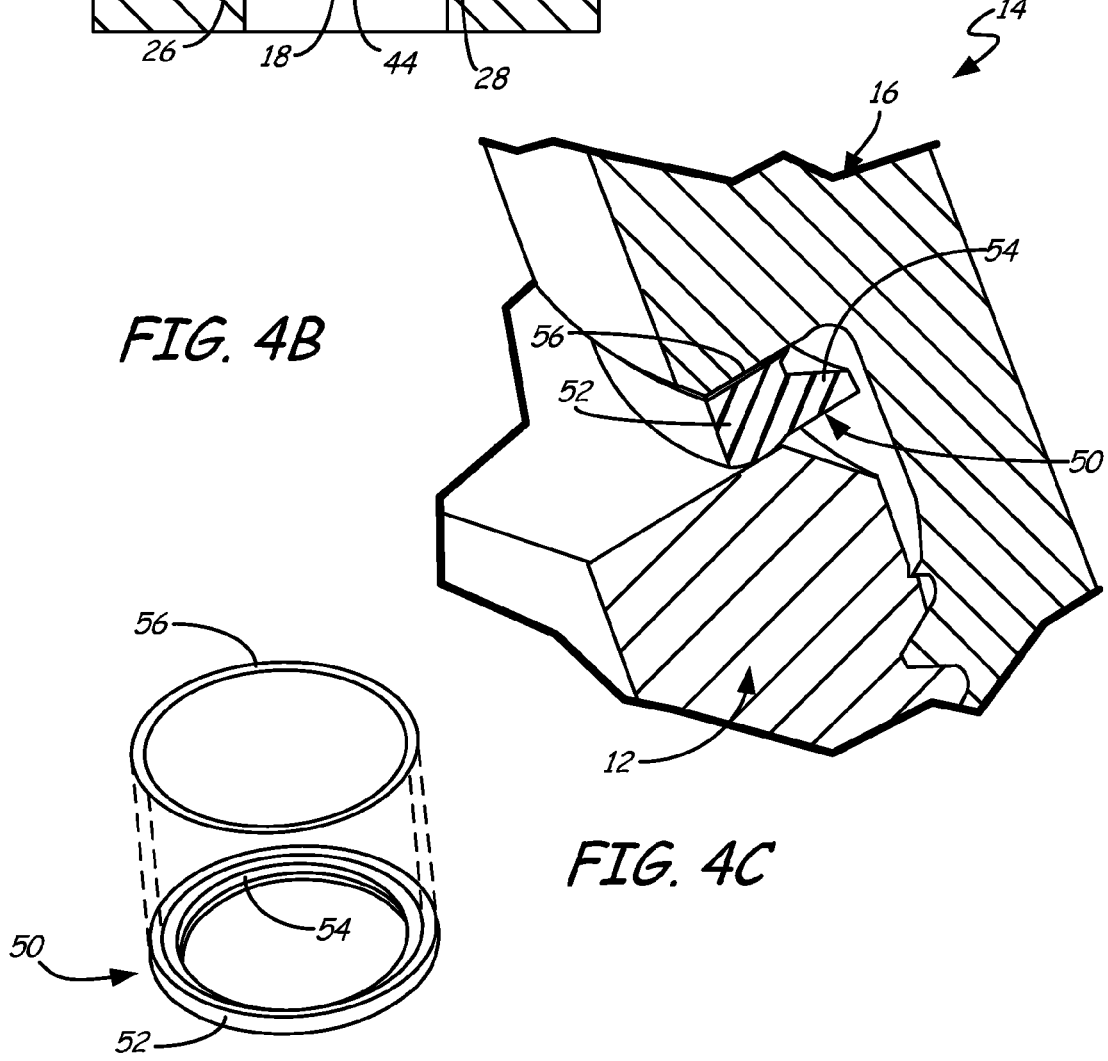
FIG. 4C

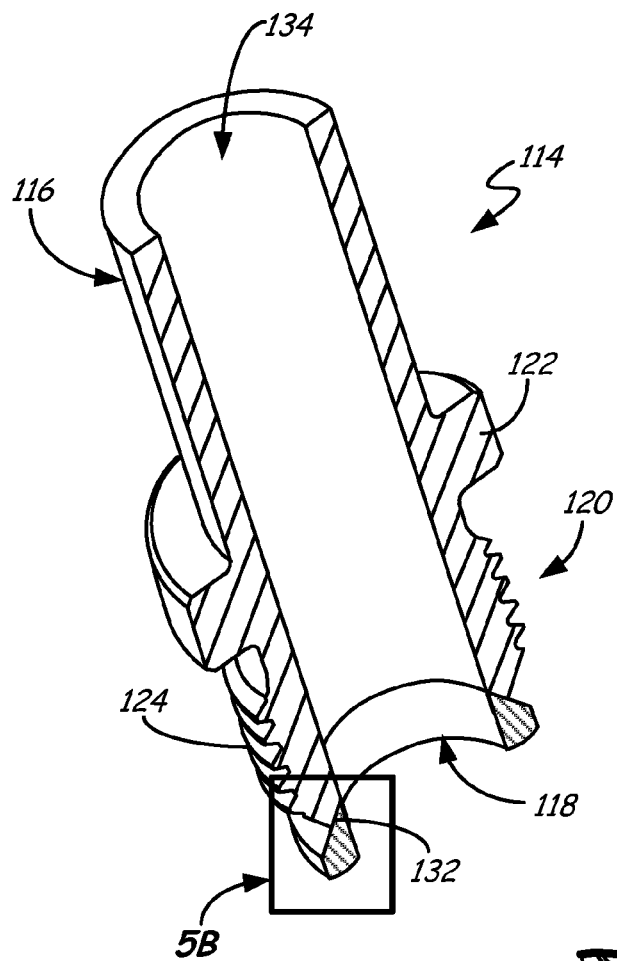
FIG. 5A
FIG. 5B
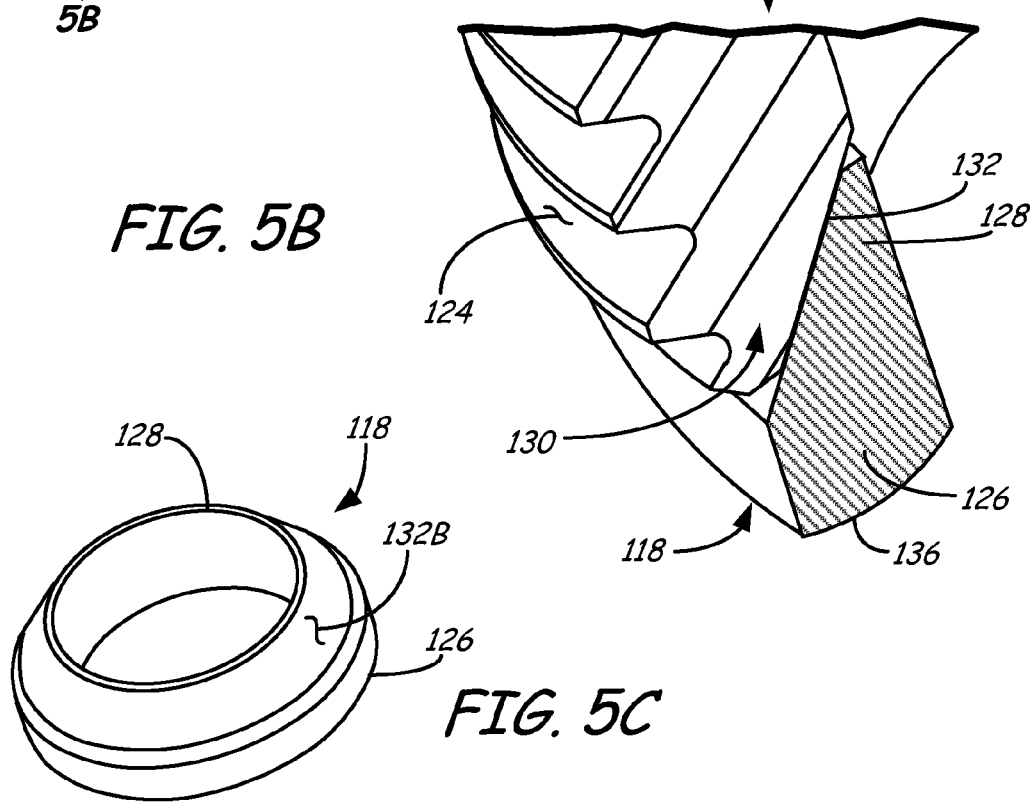
FIG. 5C

OIL TRANSFER TUBE AND ASSEMBLY

BACKGROUND

Gas turbine engine components such as bearings require continuous lubrication provide cooling and lubrication due to high operating temperatures, pressures, and friction. Oil is distributed to these components throughout the engine in a series of tubes. For example, a bearing housing may receive oil from a transfer tube connected to a plenum with multiple feed lines and nozzles. Oil transfer tubes and seals are subject to high stresses and torque in addition to the high temperatures and pressures, which can lead to premature leakage and failure. When a leak occurs in the vicinity of hot engine parts, the oil can coke up and catch fire, necessitating unscheduled replacement and repair of the entire engine.

It is relatively easy for technicians to overtorque oil transfer tubes when trying to retighten a tube to fix or prevent oil leaks. When the tube is overtorqued, it becomes difficult or impossible to remove due in part to extrusion of the copper seal material between the threads at the seal interface. Thus it would be helpful to provide a transfer assembly that simultaneously prevents or discourages overtorquing while still minimizing leaks.

SUMMARY

A fluid transfer tube comprises a base, a plurality of external threads, and an annular shoulder. The base is disposed at a first axial end of the tube. The plurality of external threads are integrally formed into at least a portion of the base for securing the base into a boss. The annular shoulder is fixed to an outer diameter of the tube at a first distance from the first axial end, causing the shoulder to contact an outer surface of the boss with the base of the tube at a maximum depth in a receiving portion of the boss to prevent further downward travel of the base.

A fluid transfer assembly comprises a tube and a compression seal. The tube includes a base at a first axial end for installation into a boss, a tube lip with a tube contact surface proximate the first axial end, and an annular shoulder fixed to an outer diameter of the tube at a first distance from the first axial end. The compression seal includes a seal body, a seal lip above the seal body with a seal contact surface configured to complement the corresponding tube lip. The first distance causes the shoulder to contact an outer surface of the boss with the base of the tube reaches a depth into a receiving portion of the boss to define maximum axial compression of the seal.

A method is disclosed for retrofitting a fluid transfer assembly comprising an existing fluid transfer tube and an existing compression seal secured into a receiving portion of a boss. The existing fluid transfer tube and existing compression seal are removed from the receiving portion of the boss. A maximum travel depth is determined for the fluid transfer tube into the boss. The tube is modified to affix an annular shoulder to an outer diameter of the fluid transfer tube to such that a bottom surface of the shoulder is a first distance from the first axial end of the tube, with the first distance substantially equivalent to the selected maximum travel depth. A new or refurbished compression seal is placed into the receiving portion of the boss. The modified fluid transfer tube is threaded into the receiving portion of boss to axially compress and radially expand the seal.

BRIEF DESCRIPTION OF THE DRAWINGS

FIG. 4A depicts the transfer tube assembly with a washer disposed between the shoulder and the boss.

FIG. 4B is a detailed view of the contact area of the shoulder, washer, and boss from FIG. 4A FIG. 4C shows the washer and contact area from FIG. 4A.

FIG. 5A is a perspective cross-sectional view of a first alternative embodiment of the tube assembly having a conical convex seal and a complementary concave tube base.

FIG. 5B is a detailed view of the contact area of the assembly shown in FIG. 5A.

FIG. 5C shows the convex seal from the assembly shown in FIG. 5A.

DETAILED DESCRIPTION

Figure 1:
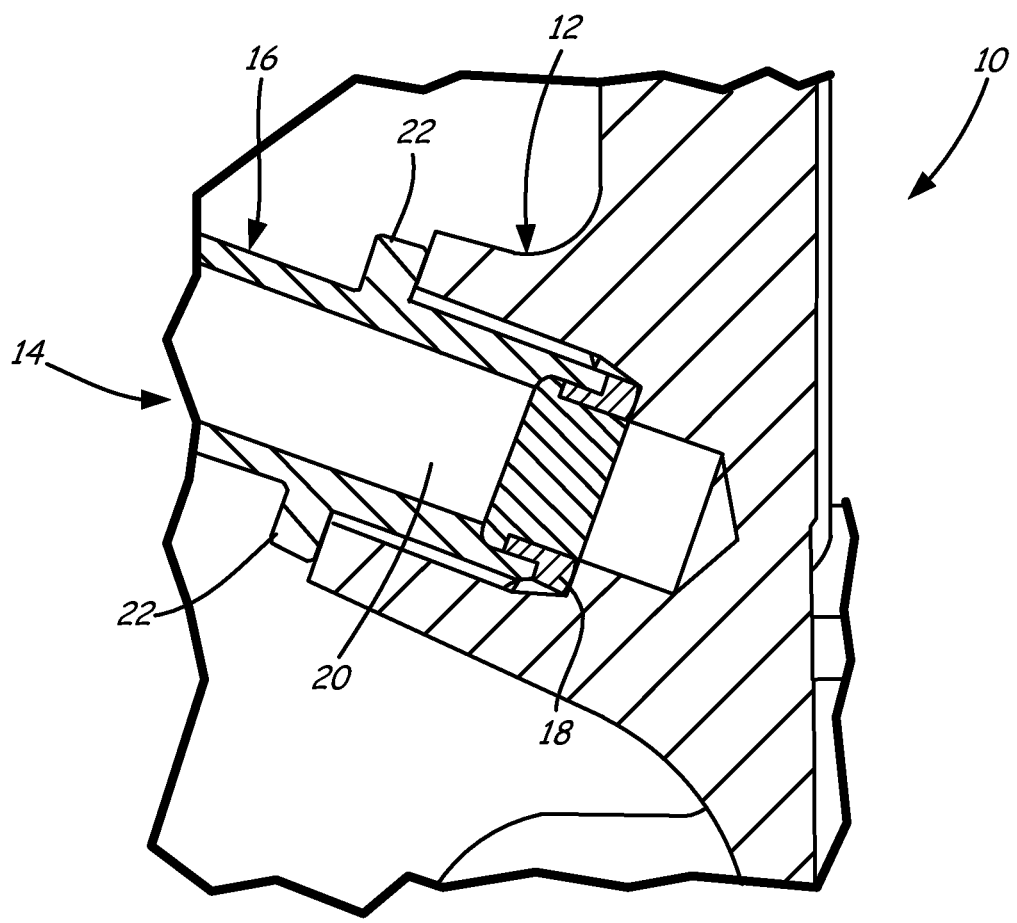
FIG. 1 is a schematic of an oil transfer tube assembly secured to a boss on a portion of a rear bearing housing of a gas turbine engine.

FIG. 1 shows an area of a gas turbine engine that includes a portion of rear bearing housing 10, boss 12, oil transfer tube assembly 14, tube 16, seal 18, tube base 20, and shoulder 22. Housing 10 houses bearings of a gas turbine engine (not shown). This engine may be an industrial gas turbine or one installed on an aircraft, either to provide motive power or to provide backup electrical power as an auxiliary power unit (APU). The general operation of gas turbine engines are well-known and will not be discussed in detail here except as necessary background for describing the various features of the invention.

Rear bearing housing 10 includes boss 12 for receiving oil transfer tube assembly 14 comprising tube 16 and seal 18. Tube 16 and seal 18 are secured to into boss 12 by placing seal 18 into a well of boss 12 and threading tube base 20 into the well to compress seal 18 until shoulder 22 contacts boss 12. This shown in more detail in subsequent figures.

Figure 2A:
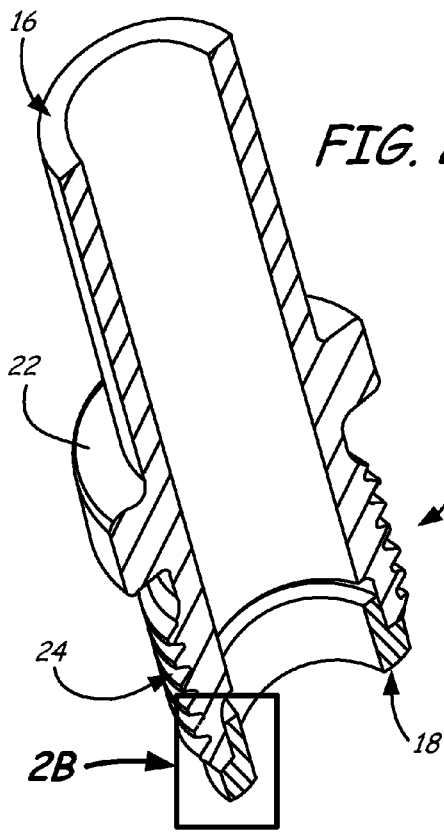
FIG. 2A is a perspective cross-section of an oil transfer tube assembly with a seal and a tube having a shoulder.

FIG. 2A is a perspective cross-section of oil transfer tube assembly 14 with tube 16, seal 18, tube base 20, shoulder 22, and tube threads 24. Shoulder 22 extends annularly around the outer diameter of tube 16 above tube base 20 and tube threads 24. Seal 18 is compressed in boss 12 (shown in FIG. 1) in order to prevent oil in tube 16 from reaching the space around tube threads 24.

In prior tube assemblies without a shoulder above the base or the threads, a high degree of torque is often required to secure the tube in place and retain the seal in compression to prevent leakage. Through normal use and repeated tightening by technicians seeking to stop leaks, the seal breaks down and leaks eventually become more frequent and severe. In many cases, high torque values exerted on the seal and threads can cause additional problems, such as extruding of the seal material into the mating threads, complicating tube and seal removal for engine maintenance or repair.

In contrast, shoulder 22 provides a mechanical "stop" for tube assembly 14 to limit downward travel of tube base 20 into boss 12 (shown in FIG. 1A). Shoulder 22 is provided at a height such that it contacts the top of boss 12 as seal 18 is compressed to an optimal degree. This reduces the total contact stresses around seal 18 and minimizes damage to seal 18 while also reducing and preventing leaks.

Figure 3A:
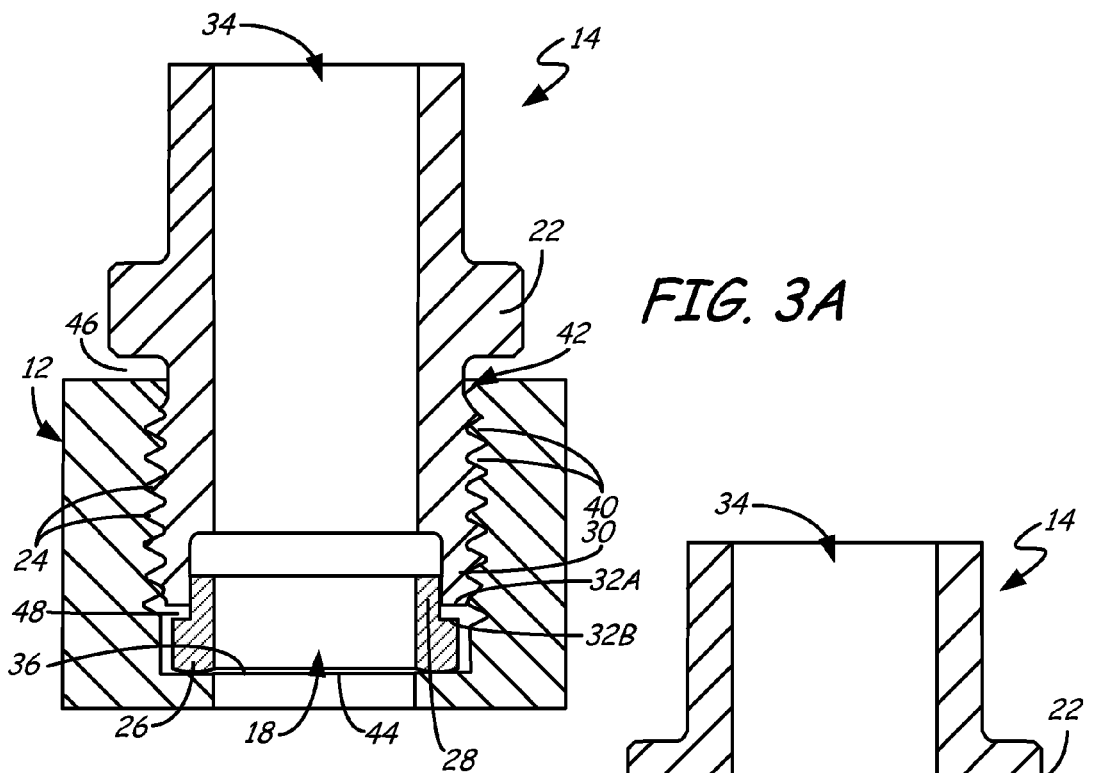
FIG. 3A shows the first stage of installing the oil transfer tube assembly.
Figure 3B:
FIG. 3B shows the second stage of installing the oil transfer tube assembly.
Figure 3C:
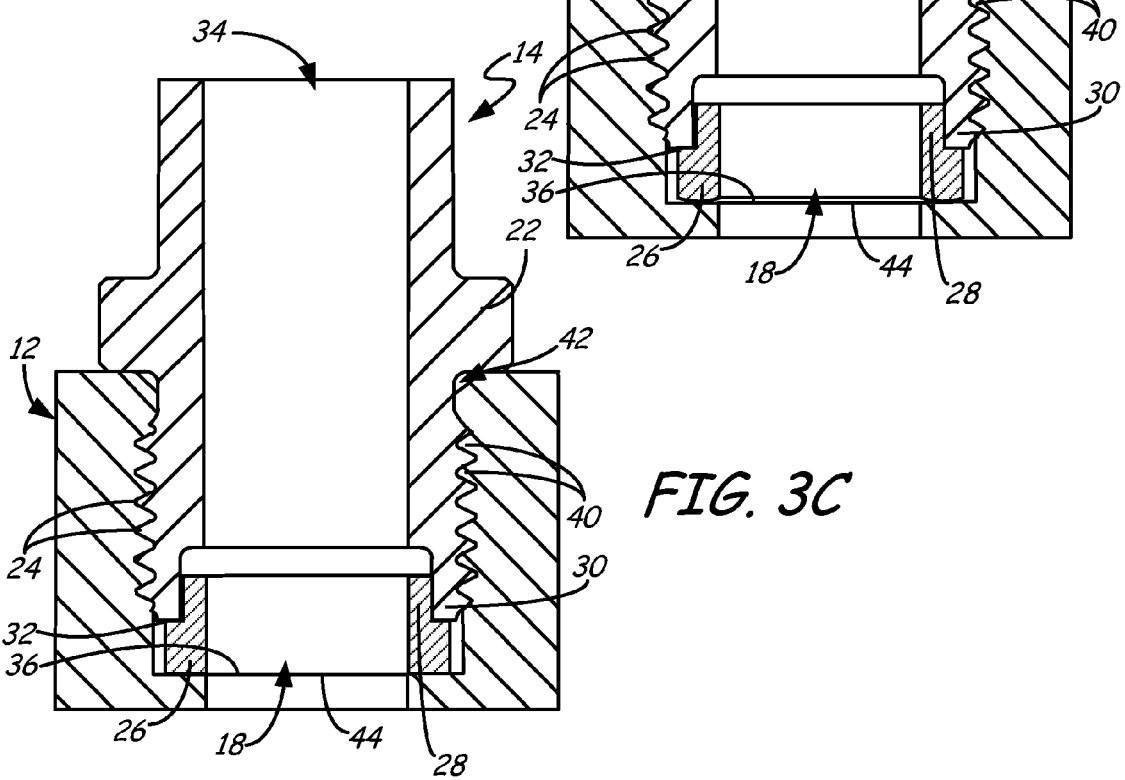
FIG. 3C shows the third stage of installing the oil transfer tube assembly.

The axial position of shoulder 22 restricts the downward travel distance of tube base 20 when the bottom of shoulder 22 contacts boss 12 (as seen in FIGS. 3A-3C). This in turn prevents the technician from applying excessive torque to tube 14, while also providing additional surface area over which to spread the applied torque. Shoulder 22 is positioned so as to restrict downward movement and thus torque to an appropriate degree that allows for sufficient compression of seal 18 for minimizing leaks while also extending the time before seal breakdown. Limiting downward travel and torque also minimizes extrusion of seal material into threads 22, simplifying removal of tube 16 and seal 18 by maintaining the original thread interface.

Figure 2B:
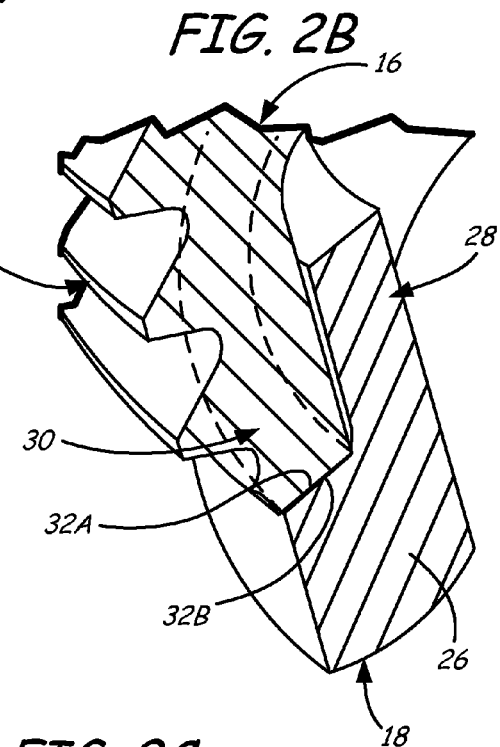
FIG. 2B is a detailed view of the contact area of the tube and seal from FIG. 2A.

FIG. 2B shows a magnified portion of tube assembly 14 from FIG. 2A, with seal 18, tube base 20, tube threads 24, seal body 26, seal lip 28, tube lip 30, and seal contact surfaces 32A, 32B. Seal 18 includes seal body 26 and seal lip 28, while tube base 20 includes tube lip 30 with a number of external tube threads 24. Tube base 20 fits over seal 18 and on seal body 26 by arranging tube lip 30 over an outer edge of seal lip 28 and engaging contact surfaces 32A, 32B. As shown in FIGS. 3A-3C, seal body 26 is axially compressed by tube lip 30 and radially expands to prevent oil from flowing out of tube 16 and into the area around tube threads 24. Details of tube 16 and seal 18 are shown individually in FIGS. 2C and 2D.

Figure 2C:
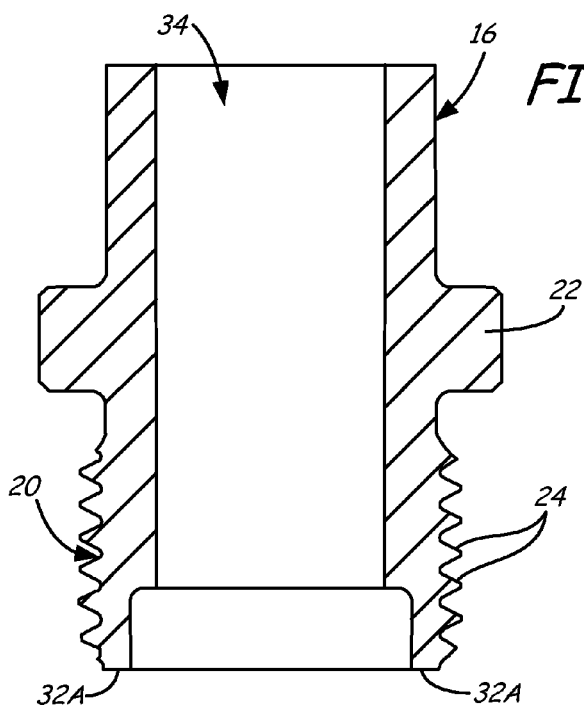
FIG. 2C shows a cross-section of the oil transfer tube and shoulder.

FIG. 2C is a cross-section of oil transfer tube 16 with tube base 20, shoulder 22, tube threads 24, tube lip 30, tube contact surface 32A and tube bore 34. As will be seen in FIGS. 3A-3C, tube base 20 is threaded via tube threads 24. Contact surface 32A compresses seal 18 (shown in FIG. 2D) in a receiving well to minimize oil escaping from tube bore 34.

Tube 16 can be manufactured from any material providing suitable mechanical and temperature resistance for the particular job, including many grades of carbon steel or stainless steel. Shoulder 22 can be integrally formed as part of the exterior of tube 16 such as by forging, casting, and/or machining. Shoulder 22 can alternatively be formed separately as a ring, toriod, or similar geometry and welded or otherwise bonded at the desired height onto a standard tube. This can be done either during initial manufacture of tube 16, or as a repair or retrofit.

The effective diameter and depth of shoulder 22 should be sufficient to withstand the applied torque and provide an appropriate surface area for contacting an outer surface of a boss. However, shoulder 22 should also not be dimensioned to substantially interfere with adjacent components during installation or operation.

Figure 2D:
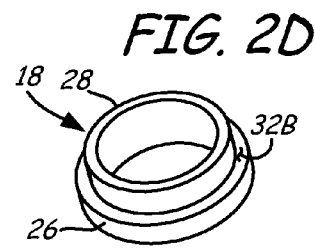
FIG. 2D shows the seal and a projection of the contact area from FIG. 2A.

FIG. 2D is a perspective view of seal 18 with seal body 26, seal lip 28, and seal contact surface 32B. As will be shown in FIGS. 3B and 3C, seal 18 sits loosely in a well of boss 12. Seal body 26 is compressed as tube 16 is threaded into boss 12. FIG. 2D also includes seal contact surface 32B, which is the upper portion of seal body 26 extending outside seal lip 28. Seal contact surface 32B is approximately equivalent to tube contact surface 32A to evenly distribute the compressive stresses from torque applied to tube 16.

Seal 18 can be made from any material suitable for the particular application. In the example of an oil transfer tube assembly for a bearing housing, softer metals such as copper or copper alloys will be effective. These example materials provide sufficient compression and deformation to form an effective seal while also resisting relatively high temperatures and chemical interactions. In other less chemically and thermally reactive conditions, seal 18 can comprise, for example, a cured silicone, perfluorocarbon, or fluorocarbon resin.

Figure 2E:
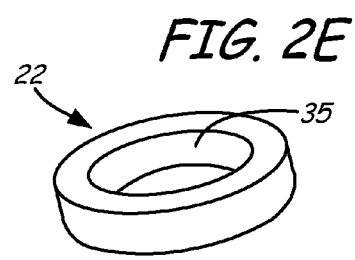
FIG. 2E is a perspective view of the tube shoulder.

FIG. 2E shows shoulder 22 with inner diameter 35. As noted above, tube assembly 14 can be manufactured integrally with shoulder 22, or alternatively can be retrofitted onto an existing tube assembly. An existing tube assembly without a shoulder can be removed from an existing engine. Shoulder 22 can then be welded onto the existing tube proximate inner diameter 35. The distance of shoulder 22 from the threaded axial end of the tube is determined to accommodate the installation or reinstallation steps depicted in FIGS. 3A-3C.

FIGS. 3A-3C progressively depict the steps of assembly 14 being received into boss 12. FIG. 3A includes boss 12, oil transfer tube assembly 14, tube 16, seal 18, tube base 20, tube shoulder 22, tube threads 24, seal body 26, seal lip 28, tube lip 30, tube and seal contact surfaces 32A, 32B, tube bore 34, seal base 36, boss threads 40, boss well 42, well base 44, first axial gap 46, and second axial gap 48.

FIG. 3A shows the first stage of installing oil transfer tube assembly 14 with seal 18 disposed in well 42. Seal 18 is sized to rest loosely in well 42 to provide sufficient room for radial expansion that will eventually result in filling the volume at the base of well 42. Tube base 20 is then received by well 42 and secured via tube threads 24 and boss threads 40.

At this stage, prior to contact between seal 18 and tube base 20, there is first axial gap 46 between shoulder 24 and boss 12, as well as second axial gap 48 between tube base 20 and seal 18. First gap 46 is slightly larger than second axial gap 48. This is because tube base 20 is to contact seal 18 at surfaces 32A, 32B prior to shoulder 22 contacting boss 12. Seal base 36 also is not yet fully sealed against well base 44 due to relative curvature of the two surfaces and the lack of axial compression or radial expansion. To further simplify installation, tube threads 24 and/or boss threads 40 can be plated with a silver-based compound. Plated or unplated threads can also be coated with oil just before tube base 20 is first threaded into well 42 to further reduce the coefficient of friction therebetween.

FIG. 3B includes boss 12, oil transfer tube assembly 14, tube 16, seal 18, tube base 20, tube shoulder 22, tube threads 24, seal body 26, seal lip 28, tube lip 30, tube/seal interface 32, tube bore 34, seal base 36, boss threads 40, boss well 42, well base 44, and first axial gap 46.

Here, FIG. 3B shows the second stage of tube assembly 14 being received by boss 12. As tube base 20 is threaded further into well 42, first axial gap 46 is smaller but still visible between boss 12 and shoulder 22. Second gap 48 between tube base 20 and seal 18 is now gone and replaced by tube/seal interface 32 (interface between surfaces 32A and 32B from FIG. 3A). Here, shoulder 22 is positioned high enough from the end of tube 16 such that it does not contact boss 12. This ensures that seal 18 can be compressed as the remainder of tube base 20 is threaded and secured into well 42 (shown in FIG. 3C). Seal base 36 has not yet been fully compressed against well base 44, leaving a small space between these surfaces as well. Tube base 20, which is the portion of tube 16 below shoulder 22, is roughly equal to the depth of boss well 40 less the height of seal body 26. The difference between these values represents the degree of compression required to compress seal 18 against boss well 42 and well base 44.

FIG. 3C includes boss 12, tube assembly 14, tube 16, seal 18, tube base 20, shoulder 22, tube threads 24, seal body 26, seal lip 28, tube lip 30, tube/seal interface 32, tube bore 34, seal base 36, boss threads 40, boss well 42, and boss base 44.

FIG. 3C shows tube assembly 14 finally installed and received in well 42. At this final stage, shoulder 22 is now contacting the top of boss 12. This contact prevents further torquing of tube 16 by interfering with downward travel of tube base 20 into well 42. This provides a signal to the repair or installation technician without the need for an actual torque measurement or specialized tools. This also has the benefit of preventing excess compression of seal 18, which can result in extrusion of soft seal material into areas around tube threads 24 and boss threads 40. As noted above, extrusion of seal material into the threads complicates removal of tube 16 and seal 18 due to the relative bonding strength of the copper or other seal material as compared to the lower friction interface between respective threads 22, 40. Preventing extrusion from overtorquing thus facilitates and expedites maintenance and repairs.

Tests indicate tube assembly 14 with shoulder 22 results in an approximate 30% reduction in applied torque as compared to a tube and seal assembly without a shoulder. Contact stresses are also spread more evenly over the greater surface area, with about ⅔ of the contact stresses being seen at tube/seal interface 32 and the remainder between shoulder 22 and boss 12.

FIG. 4A shows oil transfer tube assembly 14 with tube 16, seal 18, shoulder 22, tube threads 24, seal body 26, seal lip 28, tube lip 30, tube bore 34, bore threads 40, bore well 42, bore well base 44, first axial gap 46, and washer 50.

FIG. 4A corresponds roughly to FIG. 3B where tube lip 30 has been threaded over seal lip 28 but has not yet fully compressed seal body 26 against the edges of bore well 42. Washer 50, also shown in more detail in FIG. 4C, is disposed in axial gap 46 between shoulder 22 and boss 12. As can be seen here, a small oil escape path can remain between threads 24, 40. Washer 50 minimizes oil leaks from these and other sources by providing another flexible and compressible sealing surface between this oil escape path and the outside of assembly 14. When compressed by shoulder 22, washer 50 blocks oil that has escaped tube bore 34 past compressed seal 18 and the spaces between threads 24, 40. Details of washer 50 can be seen in FIGS. 4B-4C.

FIG. 4B is a detailed view of boss 12, tube assembly 14, tube 16, tube base 20, shoulder 22, washer 50, washer bead 52, and washer thread 54. FIG. 4B shows installation of washer 50 under shoulder 22. Washer 50 includes washer bead 52 and washer thread 54, which is shown in more detail in FIG. 4C. As discussed above, washer bead 52 is compressed between shoulder 22 and boss 12. Before tube base 20 is received into boss 12, washer 50 can be first threaded over tube threads 24 to its location under shoulder 22. Washer thread 54 thus simplifies placement and seating of washer 50 between shoulder 22 and boss 12.

If oil leaks are minimized with one or more features described herein, technicians are less likely to try to "fix" the leak by tightening and possibly overtorquing the tube. It should be noted that the axial position of shoulder 22 on tube 16 can optionally be modified to account for the presence of washer 50. However, washer 50 is compressible and generally has a comparatively minimal height relative to the other components. Thus any adjustment to the position of shoulder 22, if necessary, will be small to inconsequential.

FIG. 4C shows washer 50 with bead 52, thread 54, and projected washer contact surface 56. Washer 50 in this example is formed from an unreinforced silicone rubber to maximize resistance to adjacent hot surfaces and limit chemical breakdown from contact with any potential leaking oil. However, the material can vary depending on the surrounding thermal, mechanical, and chemical conditions. Washer 50 has a unique design that simplifies installation and maximizes leak prevention. As was shown in FIG. 4B, washer 50 is threaded onto tube base 20 using washer thread 54 before tube base 20 is received by boss 12. For clarity, FIG. 4C includes a projection of contact surface 56. Contact surface 56 provides the sealing interface between washer 50 and boss 12 when bead 52 is compressed.

Alternative embodiments of the oil transfer tube assembly are shown below and illustrate additional features for further reducing oil leaks. Washer 50 can also be adapted as necessary to be incorporated into some or all of these alternative embodiments.

FIG. 5A includes tube assembly 114 with tube 116, seal 118, tube base 120, shoulder 122, tube threads 124, tube/seal interface 132, and tube bore 134. FIG. 5A shows an alternative example embodiment of tube assembly 114, which can be received by a boss such as was shown in FIGS. 3A-3C. As compared to tube assembly 14, tube assembly 114 has greater interface area 132 between tube 116 and seal 118. This further helps to spread the torque and the resulting stresses around, as well as providing more area to block oil from leaking out of tube bore 134. This is accomplished in part by providing a complementary concave/convex interface between tube 116 and seal 118. Shoulder 122 has a similar effect of restricting downward movement of tube 116 and thus preventing overtorquing and extrusion of material from seal 118 into tube threads 124.

FIG. 5B is a detailed view of tube assembly 114 around tube/seal interface 132. FIG. 5B also includes tube 116, seal 118, tube threads 124, seal body 126, seal lip 128, tube lip 130, and seal base 136. As seen here, seal 118 includes seal body 126 with conical convex seal lip 128 which interfaces with complementary tube lip 130 to increase the area of interface 132. Interface 132 is arranged at an oblique angle to a central axis of tube 116 to increase the contact area. Depending on the actual contact angle between tube 116 and seal 118, the contact area of interface 132 can be more than double that of interface 32, which is perpendicular to the central axis as shown above. Additional contact area makes it easier to compress seal 118 with a given torque value in addition to providing additional surface area to prevent and minimize oil leaks from tube bore 134 (shown in FIG. 5A).

FIG. 5C shows conical convex seal 118 with seal body 126, seal lip 128, and convex contact surface 132B. As was seen also in FIG. 5B, convex contact surface 132B has about double the surface area as compared to corresponding contact surface 32B.

Figure 6A:
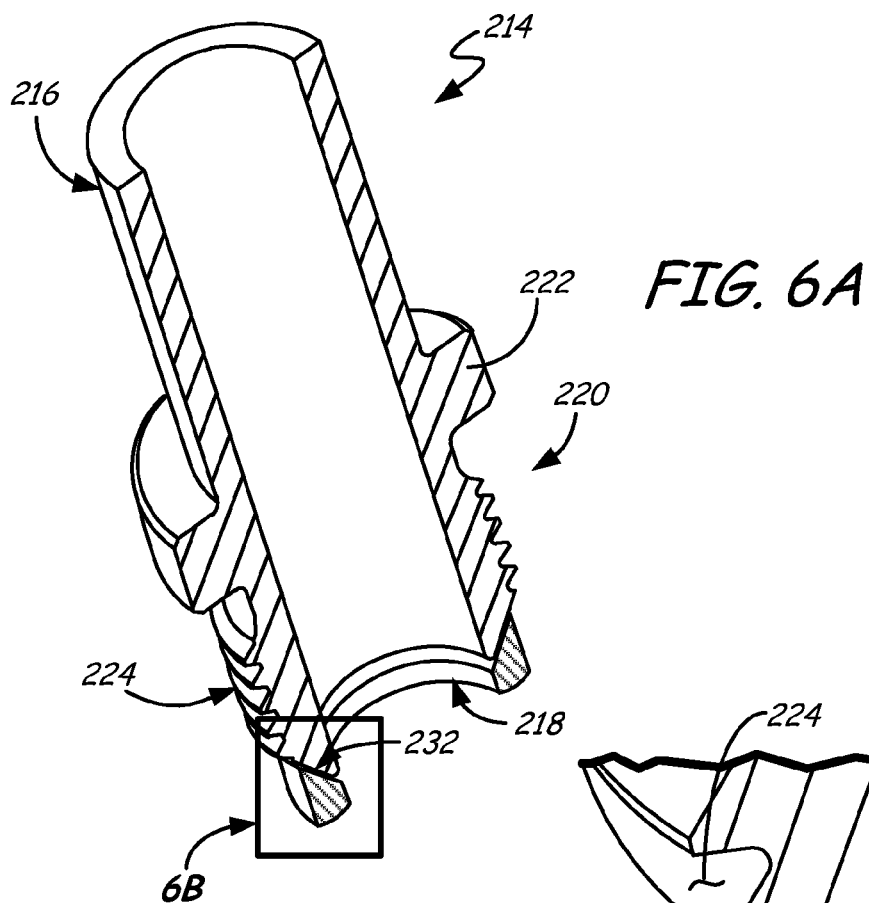
FIG. 6A is a perspective cross-sectional view of a second alternative embodiment of the tube assembly having a concave seal and a complementary conical convex tube base.

FIG. 6A includes tube assembly 214 with tube 216, seal 218, tube base 220, shoulder 222, tube threads 224, tube/seal interface 232, and tube bore 234. FIG. 6A is a second alternative example embodiment of tube assembly 114 that can be installed into a boss such as was shown in FIGS. 3A-3C. Like tube assembly 114, tube assembly 214 has greater contact area at interface 232 than tube assembly 14 to further spread the torque and the resulting stresses around, as well as provide more area to restrict oil leakage out of tube bore 234. This is accomplished here by providing a complementary convex/concave arrangement between tube 216 and seal 218, which is shown in more detail in FIG. 6B. Shoulder 224 has a similar effect of restricting downward movement of tube 216 and thus preventing overtorquing and extrusion of material from seal 218 into tube threads 224.

Figure 6B:
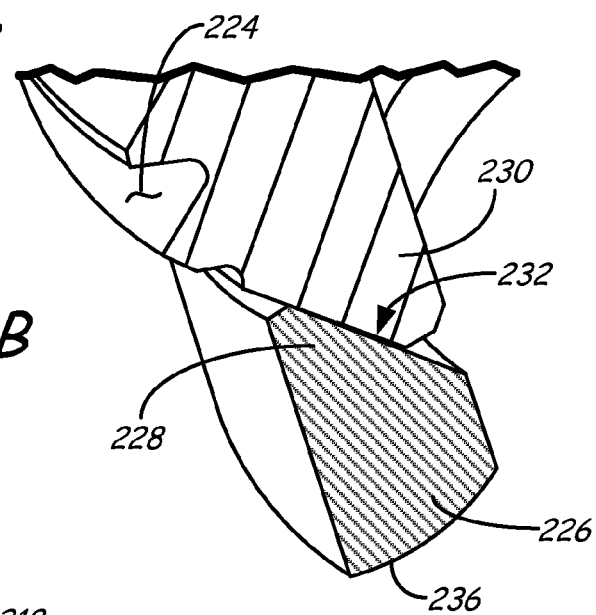
FIG. 6B is a detailed view of the contact area of the assembly shown in FIG. 6A.

FIG. 6B is a detailed view of tube assembly 214 around contact surfaces 232. FIG. 6B also includes tube 216, seal 218, tube threads 224, seal body 226, seal lip 228, tube lip 230, and seal base 236. Similar to seal 118 in FIG. 5B, seal 218 includes seal body 226 with seal lip 228 which interfaces with complementary tube lip 230 to increase the contact area of interface 232. Here, however, seal lip 228 is concave while tube lip 230 is convex, the opposite arrangement of tube assembly 114 shown in FIGS. 5A-5C.

Figure 6C:
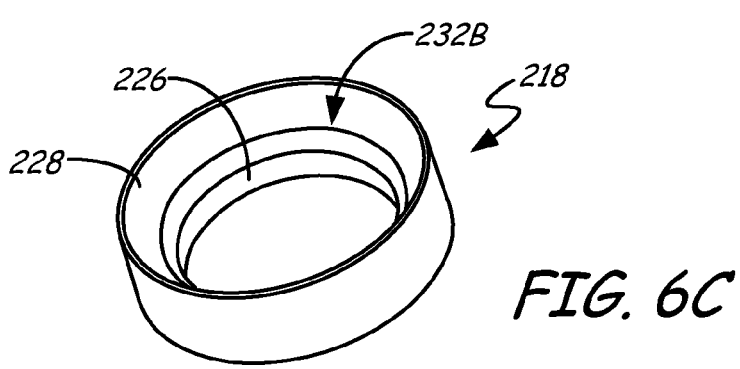
FIG. 6C shows the concave seal from the assembly shown in FIG. 6A.

FIG. 6C shows seal 218 with seal body 226, seal lip 228, and convex contact surface 232B. As was seen also in FIG. 6B, concave contact surface 232B will have about double the contact surface area than corresponding contact surface 32B in FIGS. 3A-3C.

The invention has thus far been discussed in the context of an oil transfer tube assembly for a rear bearing housing of a gas turbine engine. However, application of the principles described herein are not so limited. The example embodiments can be readily modified by one skilled in the art to adapt these concepts to other lubrication or fluid transfer systems. Adaptations can be made for fluid transfer assemblies not just in gas turbine engines but other machinery as well. In addition, existing assemblies can be easily retrofitted as part of a repair or upgrade process so long as surrounding components do not interfere.

For example, the seal need not be a compressible copper seal as described here. Any known structure for restricting seepage or leakage of a fluid through connecting threads can be substituted for a seal. Examples include tape, washers, gaskets, flanges, etc. In addition, the tube need not be received by a boss on a bearing housing, but rather any structure suitable for receiving a fluid transfer tube, including internally threaded tubes.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fluid transfer assembly comprising:
   a tube including a base at a first axial end for installation into a boss, a tube lip with a tube contact surface proximate the first axial end, and an annular shoulder fixed to an outer diameter of the tube at a first distance from the first axial end, the first distance configured to cause the shoulder to contact an outer surface of the boss with the base of the tube installed in the boss to a depth defining maximum axial compression of a seal; and
   a compression seal for installation between the tube base and a receiving well of the boss, the seal including a seal body and a seal lip above the seal body, the seal lip having a seal contact surface configured to complement the corresponding tube lip;
   wherein the boss is located on a bearing housing of a gas turbine engine.

2. The assembly of claim 1, wherein the tube contact surface and the seal contact surface define a conical tube/seal interface at an oblique angle relative to a central axis of the tube.

3. The assembly of claim 2, wherein the seal contact surface is convex and the tube contact surface is concave.

* * * * *